United States Patent
Yang et al.

(10) Patent No.: US 6,857,396 B2
(45) Date of Patent: Feb. 22, 2005

(54) HEATING DEVICE FOR HYDROGEN STORAGE CANISTER

(75) Inventors: Jefferson Ys Yang, Orange, CA (US); Yao-sheng Hsu, Taipei (TW)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 133 days.

(21) Appl. No.: 10/428,469

(22) Filed: May 2, 2003

(65) Prior Publication Data

US 2003/0215684 A1 Nov. 20, 2003

(30) Foreign Application Priority Data

May 17, 2002 (TW) ........................................ 91110425 A (51) Int. Cl.$^7$ ................................................ F22B 5/04
(52) U.S. Cl. ...................................... 122/19.2; 62/45.1
(58) Field of Search .............................. 122/19.2, 494; 126/261; 165/80.5; 62/45.1, 62

(56) References Cited

U.S. PATENT DOCUMENTS 4,566,281 A * 1/1986 Sandrock et al. ............ 62/46.3
5,361,730 A * 11/1994 Clark et al. ............... 123/41.81
5,544,701 A * 8/1996 Elder ........................ 165/80.5
6,530,233 B1 * 3/2003 Nakamura et al. ........... 62/46.2
6,748,748 B2 * 6/2004 Bradley et al. .............. 62/46.1

* cited by examiner

Primary Examiner—Gregory Wilson
(74) Attorney, Agent, or Firm—Quintero Law Office (57) ABSTRACT

A heating device for a container in which a hydrogen storage canister is disposed. The hydrogen storage canister supplies hydrogen to a fuel cell including a discharge port, and the heating device includes a water jacket and a seal member. The water jacket is disposed on the container, and communicates with the discharge port of the fuel cell. When the hydrogen storage canister is disposed on the container, the hydrogen storage canister is surrounded by the water jacket and is heated by via water from the discharge exit. The seal member is disposed between the water jacket and the container so that the hydrogen storage canister is closely abutted by the water jacket.

20 Claims, 7 Drawing Sheets

HEATING DEVICE FOR HYDROGEN STORAGE CANISTER

BACKGROUND OF THE INVENTION

1. Field of the Invention

The invention relates to a container for a hydrogen storage canister; in particular, to a container with a heating device.

2. Description of the Related Art

Recently, air pollution is more severe, and most of it comes from waste gas generated by gasoline engines. Thus, the pollution generated by the gasoline engine is worthy of consideration. To improve environmental quality, it is important to replace polluting gasoline engines with non-polluting fuel cells.

The structure and types of fuel cells are less relevant to this invention, and detailed description thereof is omitted. It is noted that fuel cells operate by combining oxygen and hydrogen, wherein oxygen is directly provided by the environment, and hydrogen is usually supplied by a hydrogen storage canister containing pure hydrogen.

Hydrogen storage alloys are disposed in the hydrogen storage canister for storing hydrogen. When the hydrogen storage canister communicates with the fuel cell, hydrogen is released from the hydrogen storage alloys so as to supply hydrogen to the fuel cell. At this point, as hydrogen is released by the hydrogen storage alloys, heat in the hydrogen storage canister is absorbed by the hydrogen storage alloys. Thus, the temperature in the hydrogen storage canister decreases. However, when the temperature in the hydrogen storage canister is low, the efficient release of hydrogen from the hydrogen storage alloys also decreases. As a result, the amount of hydrogen for supplying the fuel cell may be insufficient.

In addition, when a reaction occurs in the fuel cell, by-products, such as water or waste heat, are generated. It is important to properly use the water or waste heat.

Furthermore, in systems using hydrogen as reaction gas, such as air conditioners or engines using hydrogen, it is important that hydrogen can be reliably supplied by the hydrogen storage canister.

SUMMARY OF THE INVENTION

In view of this, the invention provides a heating device that maintains a predetermined temperature in a hydrogen storage canister.

Another purpose of this invention is to provide a container for a hydrogen storage canister that properly utilizes by-products.

Accordingly, the invention provides a heating device for a container in which a hydrogen storage canister is disposed. The hydrogen storage canister supplies hydrogen to a fuel cell including a discharge port, and the heating device includes a water jacket and a seal member. The water jacket is disposed on the container, and communicates with the discharge port of the fuel cell. When the hydrogen storage canister is disposed on the container, the hydrogen storage canister is surrounded by the water jacket and is heated by water from the discharge port. The seal member is disposed between the water jacket and the container so that the hydrogen storage canister is closely abutted by the water jacket.

In a preferred embodiment, the heating device further includes a plurality of bodies and a plurality of housings. The bodies are disposed on the container. The housings correspond to the bodies respectively, and are combined with the corresponding body.

Furthermore, each of the housings includes a first opening and a second opening respectively. Each of the bodies is formed with a concave portion so that water from the fuel cell can flow in the water jacket when the housings are combined with the bodies. The shape of the body corresponds to that of the hydrogen storage canister, and the shape of the housing corresponds to that of the corresponding body.

It is understood that the hydrogen storage canister may be cylindrical, and the bodies and the housings may be arc-shaped respectively.

In another preferred embodiment, the water jacket may be made of aluminum, and the seal member may be an O-ring.

In this invention, a container for a hydrogen storage canister is provided. The container includes a support, a heating device, and a supplying device. The support holds the hydrogen storage canister. The heating device is disposed on the support. When the hydrogen storage canister is disposed on the support, the hydrogen storage canister is surrounded by the heating device. The supplying device communicates with the heating device, and supplies the heating device with a thermal-conductive material, so that the hydrogen storage canister is heated by the heating device.

It is noted that the heating device may be a water jacket.

In a preferred embodiment, the support includes a first plate and a second plate for supporting the hydrogen storage canister, and includes a coupling for fixing the hydrogen storage canister on the support In this invention, another heating device, for a container in which a hydrogen storage canister is disposed, is provided. The heating device includes a water jacket, a supplying device, and a seal member. The water jacket is disposed on the container. When the hydrogen storage canister is disposed on the container, the hydrogen storage canister is surrounded by the water jacket. The supplying device communicates with the water jacket, and supplies the water jacket with a thermal-conductive material, so that the hydrogen storage canister is heated by the water jacket. The seal member is disposed between the water jacket and the container so that the hydrogen storage canister is closely abutted by the water jacket.

BRIEF DESCRIPTION OF THE DRAWINGS

The present invention can be more fully understood by reading the subsequent detailed description and examples with references made to the accompanying drawings, wherein:

FIG. 1b is a cross section along a line b—b in FIG. 1a;

FIG. 2a is a schematic view of a first plate in FIG. 1a;

FIG. 2b is a schematic view of a second plate in FIG. 1a;

FIG. 3a is a bottom view of a body of a water jacket in FIG. 1a;

FIG. 3b is a side view of a body of a water jacket in FIG. 1a;

FIG. 3c is a top view of a body of a water jacket in FIG. 1a;

FIG. 4 is an exploded view of a housing of a water jacket in FIG. 1a; and

DETAILED DESCRIPTION OF THE INVENTION

Figure 1A:
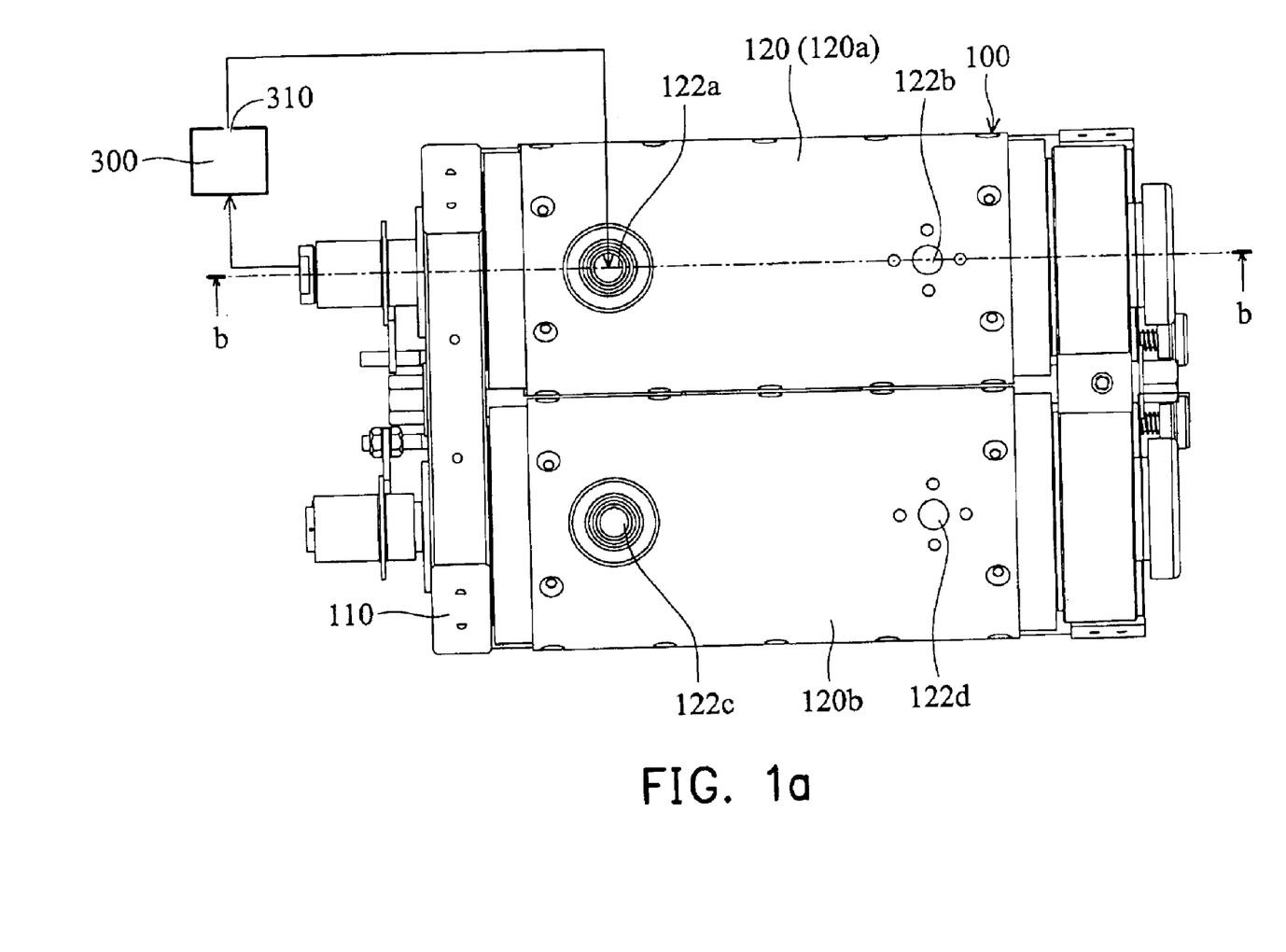
FIG. 1a is a top view of a container for a hydrogen storage canister as disclosed in this invention.
Figure 1B:
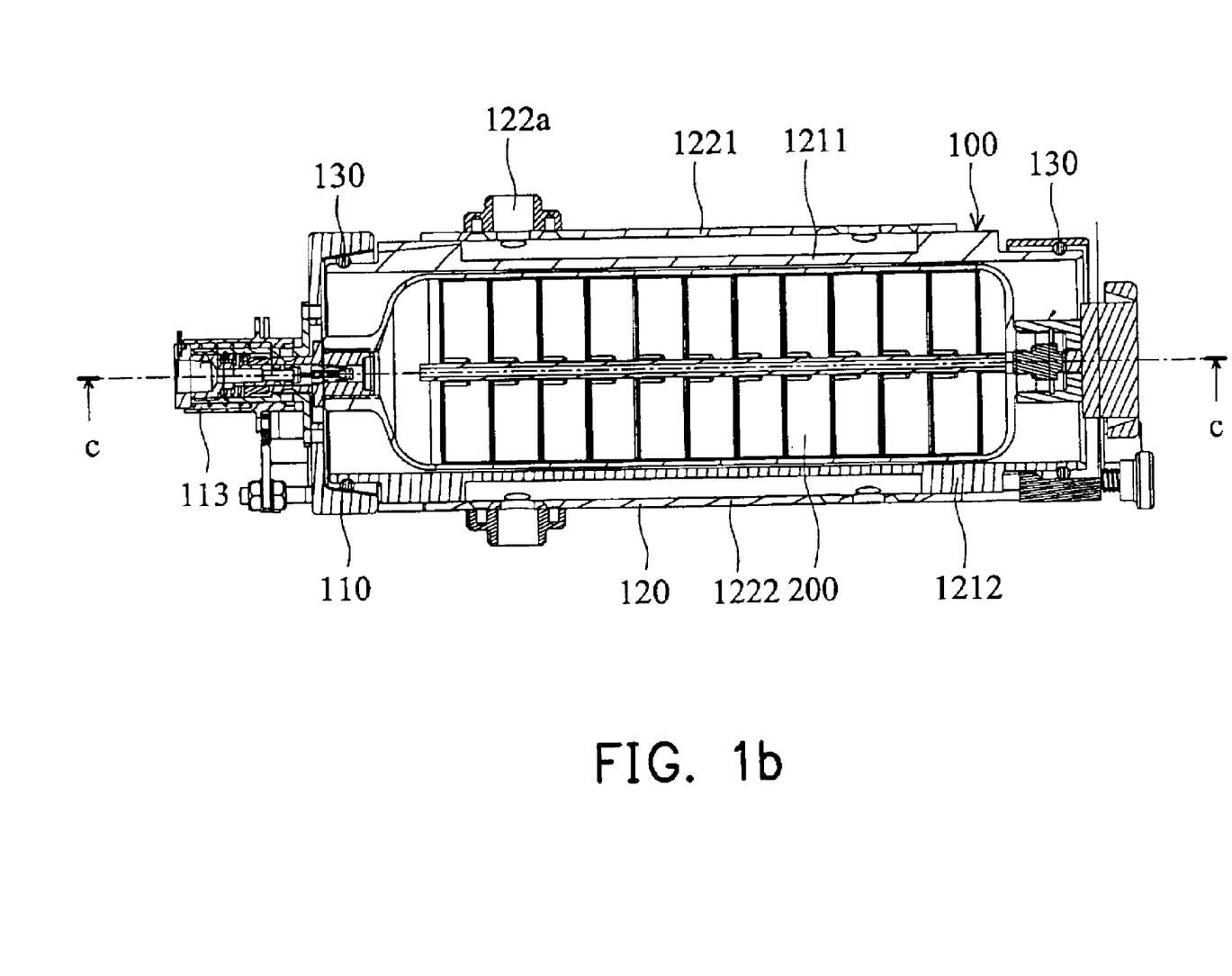
Figure 1C:
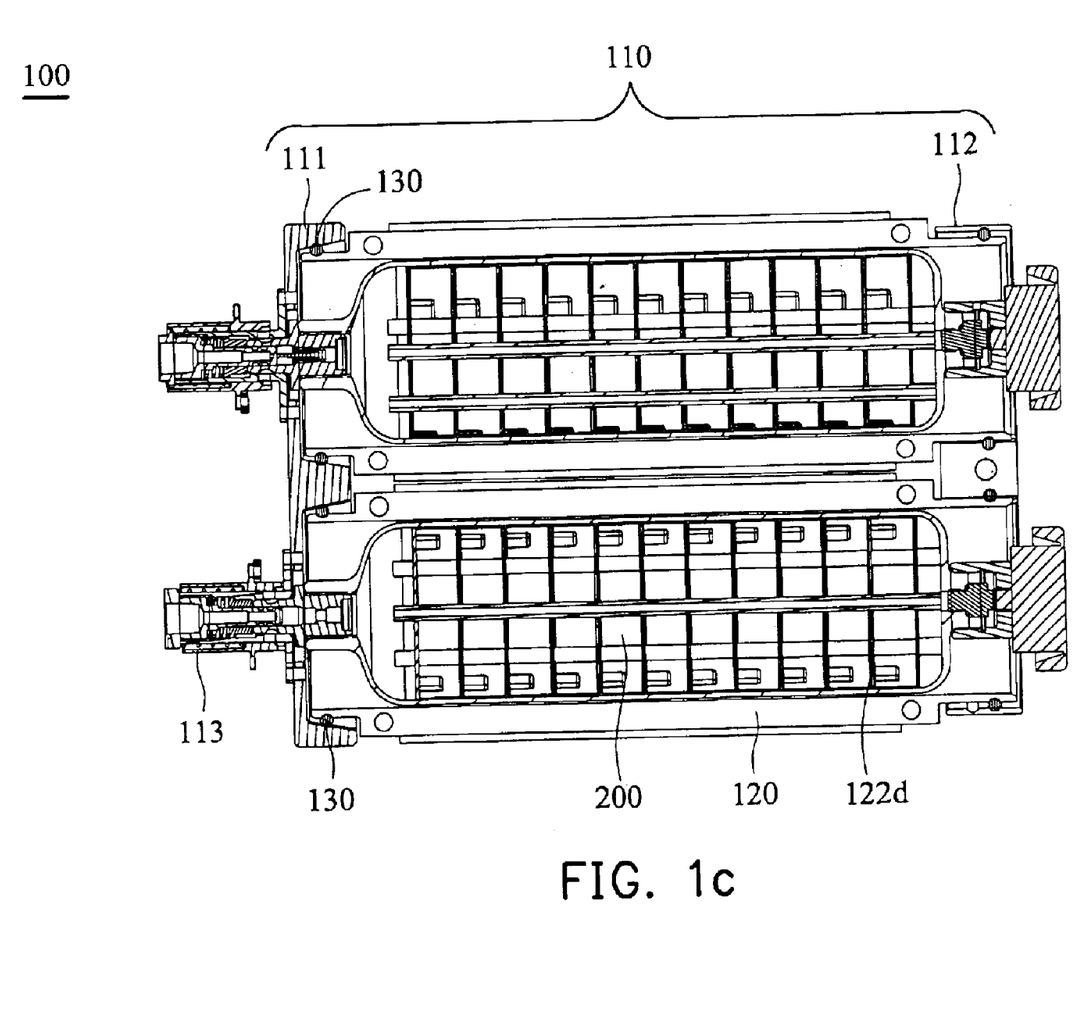
FIG. 1c is a cross section along a line c—c in FIG. 1b.

Referring to FIGS. 1a–1c, a container 100 for a hydrogen storage canister 200 as disclosed in this invention is provided. The hydrogen storage canister 200 supplies hydrogen to a fuel cell 300. The fuel cell 300 is formed with a discharge port 310. The container 100 includes a support 110, two heating devices 120, and four seal members 130.

It is noted that two hydrogen storage canisters 200 are supported by one support 110 in this embodiment. However, in practice, it is not limited to this.

Figure 2A:
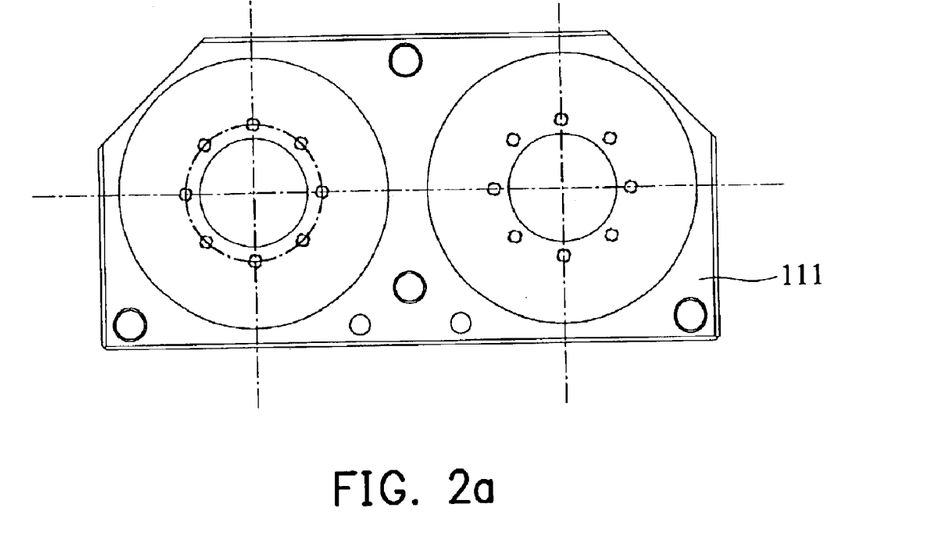
Figure 2B:
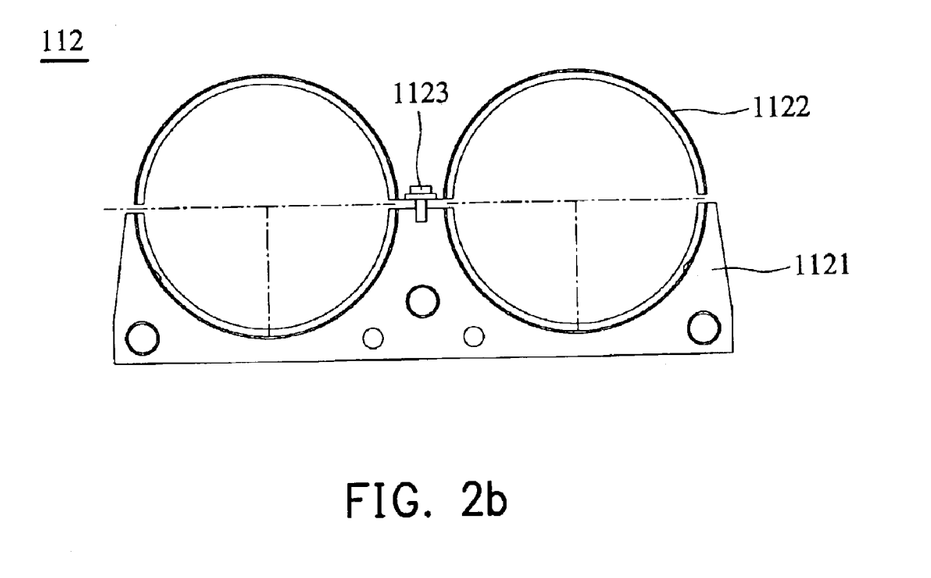
Figure 3A:
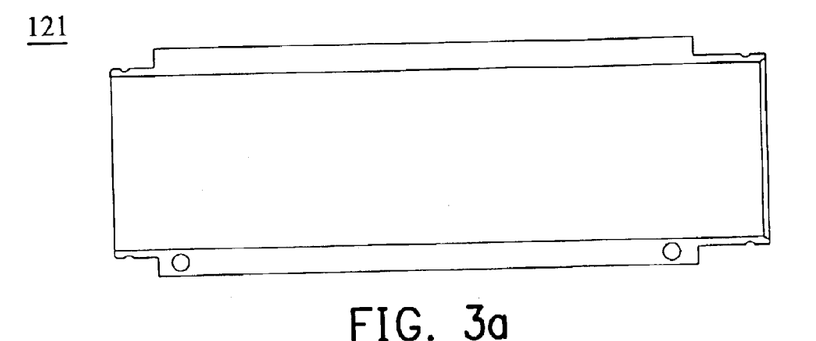
Figure 3B:
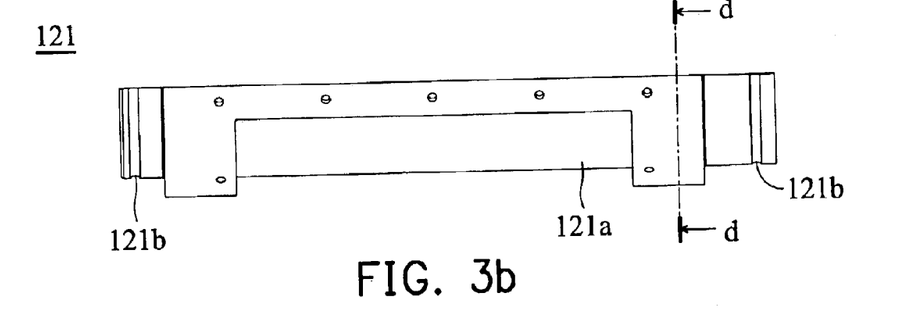
Figure 3C:
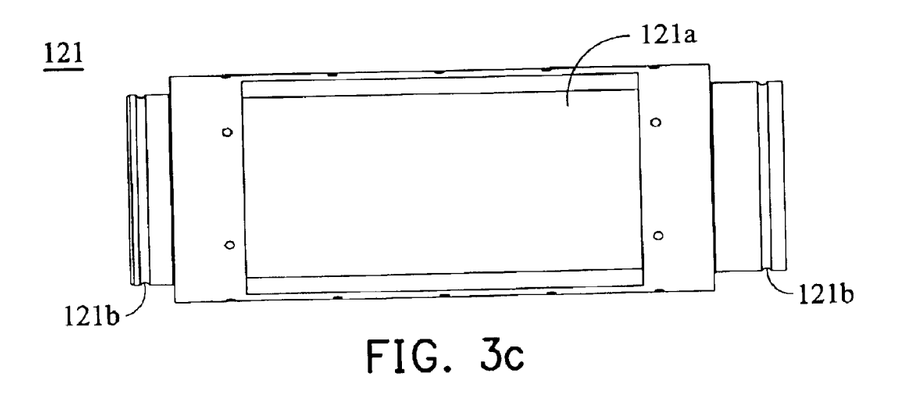
Figure 3D:
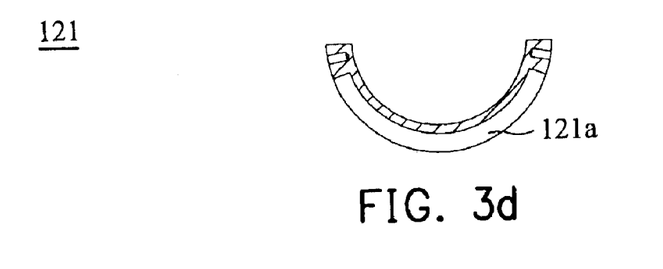
FIG. 3d is a cross section along a line d—d in FIG. 3b.

The support 110 supports two ends of the hydrogen storage canister 200, and includes a first plate 111 and a second plate 112. The first plate 111 is shown in FIG. 2a, and the second plate 112 is shown in FIG. 2b. Referring to FIG. 2b, the second plate 112 includes a base 1121, a top cover 1122, and a fixed member 1123. The top cover 1122 is combined with the base 1121 by the fixed member 1123. In addition, as shown in FIGS. 1a–1c, a coupling 113 is disposed on the first plate 111 for fixing the hydrogen storage canister 200 on the first plate 111 of the support 110.

As stated above, to put the hydrogen storage canister 200 in the support 110, the hydrogen storage canister 200 is passed through a circular hole between the base 1121 and the top cover 1122 of the second plate 112 until one end of the hydrogen storage canister 200 is abutted by the first plate 111 and is connected to the coupling 113.

It is understood that the shapes of the first plate 111 and the second plate 112 are not limited to those shown in FIGS. 2a–2b as long as the hydrogen storage canister 200 and the heating device 120 can be disposed on the support 110.

Each of the heating devices 120 is disposed on the support 110, and includes two bodies 1211, 1212 and two housings 1221, 1222 as shown in FIG. 1b. One hydrogen storage canister 200 is surrounded by two bodies 121 and two housings 122.

Two ends of the body 121 are disposed on the first plate 111 and the second plate 112 of the support 110. As shown in FIGS. 3a–3d, the body 121 is formed with a concave portion 121a. After the housing 122 is combined with the body 121, water from the fuel cell 300 can flow in the concave portion 121a of the heating device 120. The body 121 is formed with grooves 121 at two ends in which the seal members 130 are disposed.

Figure 4:
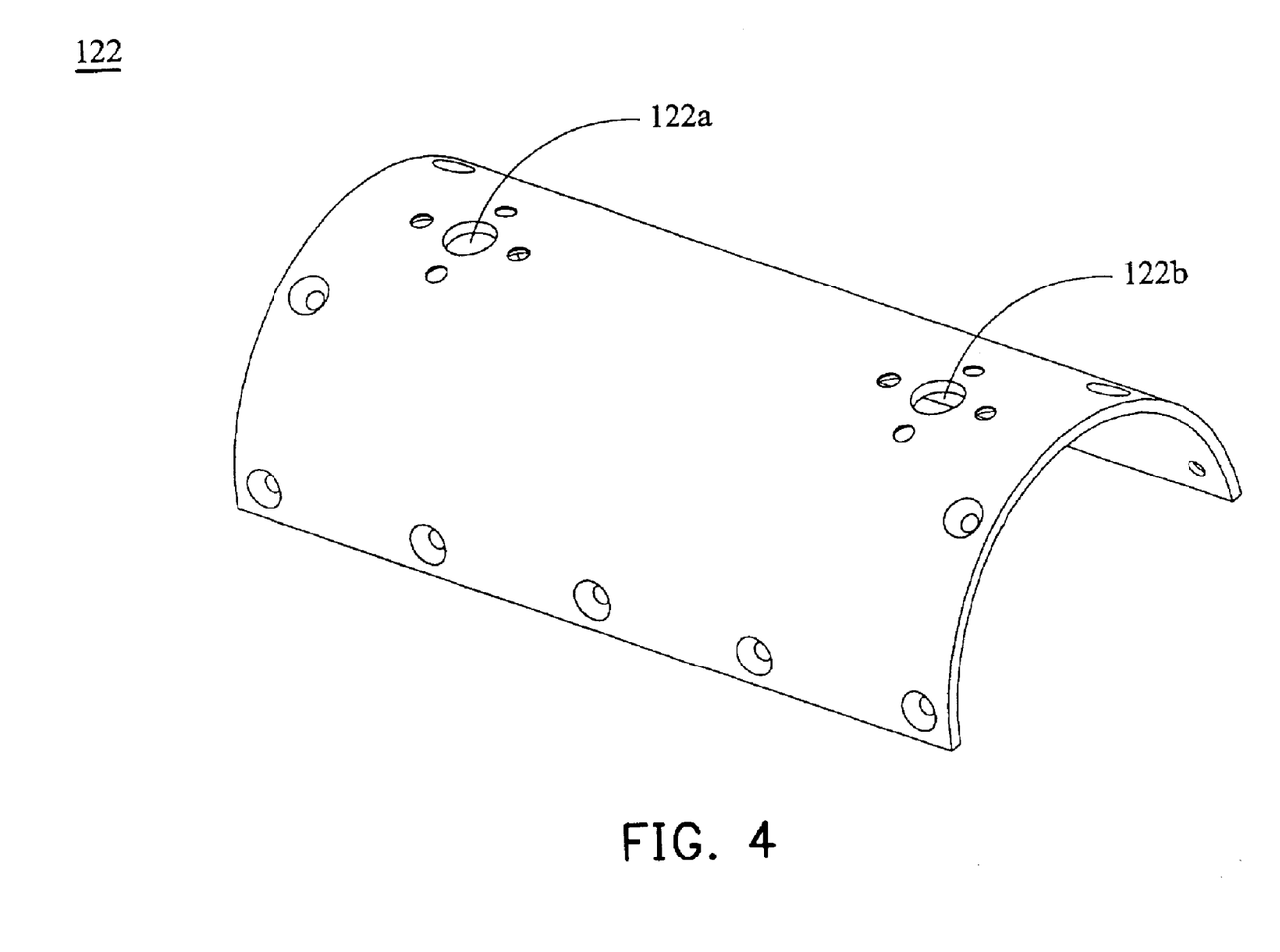

Referring to FIG. 4, the housing 122 corresponds to the body 121, and is combined with the corresponding body 121 so as to form half of the heating device 120. The housing 122 includes a first opening 122a and a second opening 122b. When the first opening 122a is used as a port for water to flow into the heating device 120, the second opening 122b is used as a port for water to flow out of the heating device 120. In contrast, when the first opening 122a is used as a port for water to flow out of the heating device 120, the second opening 122b is used as a port for water to flow into the heating device 120. For example, in FIG. 1a, the first opening 122a is used as a port for water to flow into the heating device 120. Specifically, when the first opening 122a is communicated with the discharge port 310 of the fuel cell 300, water generated by the fuel cell 300 can enter into the heating device 120 through the discharge port 310 and the first opening 122a.

Furthermore, referring to FIG. 1a, cycling of water from the fuel cell 300 in the container 100 is described. Two heating devices 120a, 120b are disposed on the support 110. The heating device 120a includes a first opening 122a and a second opening 122b, and the heating device 120b includes a first opening 122c and a second opening 122d. After water from the fuel cell 300 enters into the heating device 120a through the first opening 122a, it flows out of the heating device 120a through the second opening 122b. Then, by a pipe (not shown), water flowing from the heating device 120a enters into the heating device 120b through the second opening 122d. Finally, water flows out of the heating device 120b through the first opening 122c. Such an arrangement allows water from the fuel cell 300 to be utilized completely in heating the hydrogen storage canister 200.

Thus, when the hydrogen storage canister 200 is disposed on the support 110, it is surrounded by the heating device 120 and is heated by water from the discharge port 310 of the fuel cell 300.

It is noted that the heating device 120 is a water jacket in this embodiment; however, it is not limited to this.

In addition, the shape of the body 121 corresponds to that of the hydrogen storage canister 200, and the shape of the housing 122 corresponds to that of the body 121. For example, when the hydrogen storage canister 200 is cylindrical, the bodies 121 and the housings 122 are arc-shaped members with a half-circle cross section respectively.

It is understood that the body 121 and the housing 122 may be made of material with a high thermal conductive coefficient, such as aluminum. Thus, the efficiency of heat transfer between the heating device 120 and the hydrogen storage canister 200 is enhanced.

The seal member 130 is disposed on the groove 121b of the body 121 of the heating device 120, and is disposed between the heating device 120 and the support 110. Thus, the heating device 120 is closely adjacent to the hydrogen storage canister 200.

It is understood that the seal member 130 may be an O-ring.

Since the heating device 120 is separable, the hydrogen storage canister 200 can be continuously abutted by the heating device 120 via the seal member 130. As a result, the efficiency of heat transfer between the heating device 120 and the hydrogen storage canister 200 is enhanced.

The structure of the container for the hydrogen storage canister as disclosed in this invention is disclosed as above. Such a container has the following advantages. Since the heating device is additionally disposed in the container, the hydrogen storage canister in the container can be maintained at a predetermined temperature. Thus enhancing the efficiency of releasing hydrogen from the hydrogen storage alloys, so that hydrogen can be sufficiently supplied to the fuel cell. Furthermore, since by-products, such as waste heat and water, from the fuel cell are used by the heating device to heat the hydrogen storage canister, an additional heating source is unnecessary. That is, the design of this invention is based on a concept of environmental protection. In addition, since the heating device is separable and the seal member is disposed between the support and the heating device, the hydrogen storage canister can be continuously abutted by the heating device regardless of potential changes in the size of the hydrogen storage canister due to temperature. As a result, the efficiency of heat transfer between the heating device and the hydrogen storage canister is enhanced.

In this description it is understood that the fuel is cell is an object that the hydrogen storage canister supplies. In practice, however, it is not limited to this; that is, the heating device of this invention is applicable to other equipment that requires a hydrogen storage canister to supply hydrogen, such as a hydrogen-cooled engine.

Figure 5:
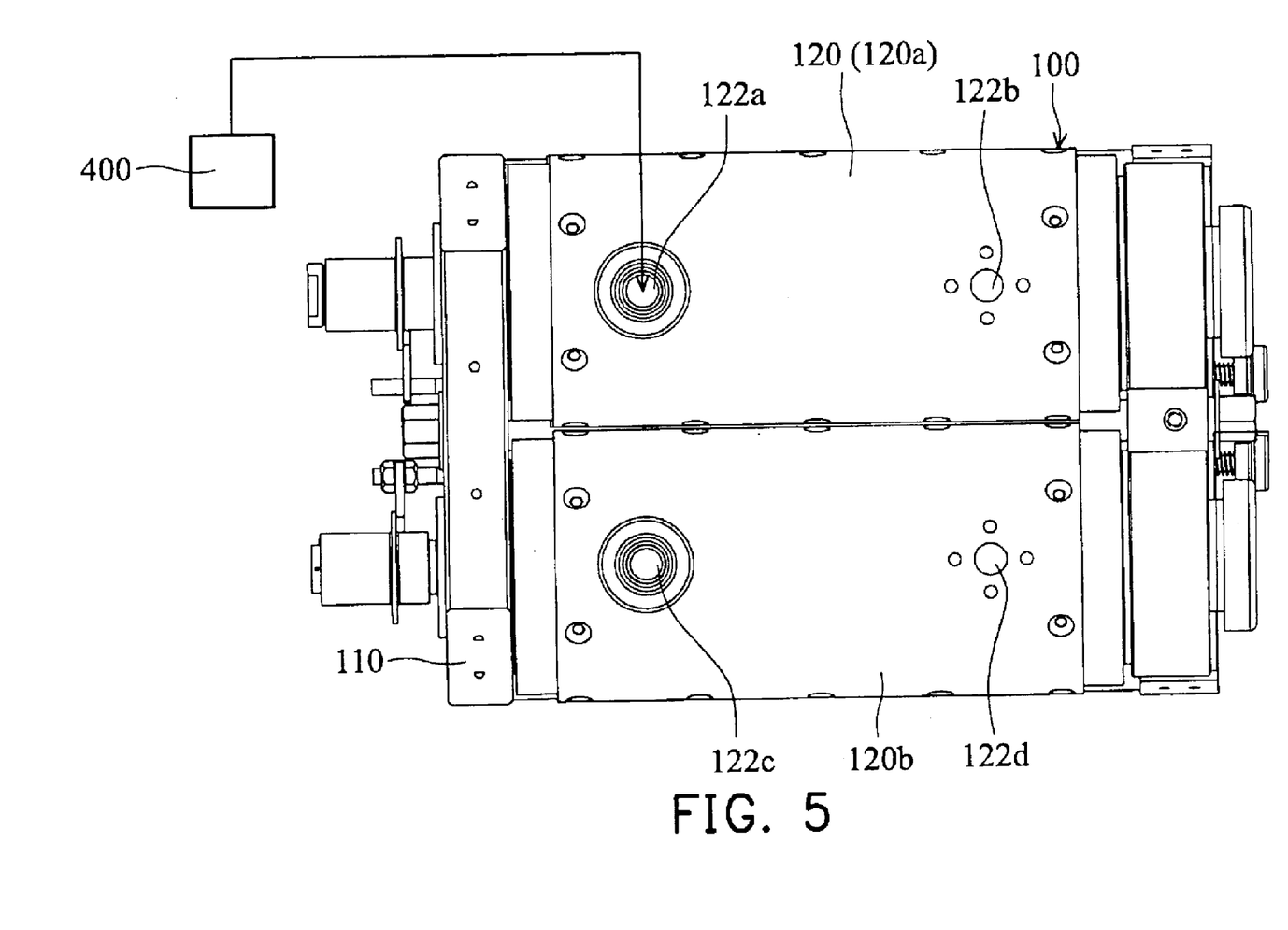
FIG. 5 is a top view of a varied embodiment of a container for a hydrogen storage canister as disclosed in this invention.

Furthermore, in this embodiment, the heating source of the heating device is water from the fuel cell. In practice, however, it is not limited to this. A supplying device 400, for example, can be disposed as shown in FIG. 5, in a situation in which there is sufficient space for the heating device. The supplying device 400 can supply a thermal-conductive material to the heating device 120 so as to heat the hydrogen storage canister therein.

While the invention has been described by way of example and in terms of the preferred embodiments, it is to be understood that the invention is not limited to the disclosed embodiments. To the contrary, it is intended to include various modifications and similar arrangements (as would be apparent to those skilled in the art). Therefore, the scope of the appended claims should be accorded the broadest interpretation so as to encompass all such modifications and similar arrangements.

What is claimed is:

1. A heating device for a container in which a hydrogen storage canister is disposed, wherein the hydrogen storage canister supplies hydrogen to a fuel cell including a discharge port, and the heating device comprises:

a water jacket, disposed on the container, communicating with the discharge port of the fuel cell, wherein the hydrogen storage canister is surrounded by the water jacket and is heated by water from the discharge port when the hydrogen storage canister is disposed on the container; and a seal member disposed between the water jacket and the container so that the hydrogen storage canister is closely abutted by the water jacket.

2. The heating device as claimed in claim 1, wherein the water jacket further comprises:

a plurality of bodies disposed on the container; and a plurality of housings, corresponding to the bodies respectively, combined with the corresponding body.

3. The heating device as claimed in claim 2, wherein each of the housings includes a first opening and a second opening respectively.

4. The heating device as claimed in claim 2, wherein each of the bodies is formed with a concave portion respectively so that water from the fuel cell can flow in the water jacket when the housings are combined with the bodies.

5. The heating device as claimed in claim 2, wherein the shape of the body corresponds to that of the hydrogen storage canister and the shape of the housing corresponds to that of the corresponding body.

6. The heating device as claimed in claim 5, wherein the hydrogen storage canister is cylindrical, and the bodies and the housings are arc-shaped respectively.

7. The heating device as claimed in claim 1, wherein the water jacket is made of aluminum.

8. The heating device as claimed in claim 1, wherein the seal member is an O-ring.

9. A container for a hydrogen storage canister, comprising:

a support for holding the hydrogen storage canister;

a heating device disposed on the support, wherein the hydrogen storage canister is surrounded by the heating device when the hydrogen storage canister is disposed on the support; and a supplying device, communicating with the heating device, for supplying a thermal-conductive material into the heating device so that the hydrogen storage canister is heated by the heating device.

10. The container as claimed in claim 9, wherein the heating device is a water jacket.

11. The container as claimed in claim 10, wherein the heating device comprises:

a plurality of bodies disposed on the container; and a plurality of housings, corresponding to the body respectively, combined with the corresponding body.

12. The container as claimed in claim 9, further comprising:

a seal member disposed between the heating device and the support so that the hydrogen storage canister is closely abutted by the heating device.

13. The container as claimed in claim 9, wherein the support includes a first plate and a second plate for supporting the hydrogen storage canister.

14. The container as claimed in claim 9, wherein the support includes a coupling for fixing the hydrogen storage canister on the support.

15. A heating device, for a container in which a hydrogen storage canister is disposed, comprising:

a water jacket disposed on the container, wherein the hydrogen storage canister is surrounded by the water jacket when the hydrogen storage canister is disposed on the container;

a supplying device, communicating with the water jacket, for supplying a thermal-conductive material into the water jacket so that the hydrogen storage canister is heated by the water jacket; and a seal member disposed between the water jacket and the container so that the hydrogen storage canister is closely abutted by the water jacket.

16. The heating device as claimed in claim 15, wherein the water jacket further comprises:

a plurality of bodies disposed on the container; and a plurality of housings, corresponding to the bodies respectively, combined with the corresponding body.

17. The heating device as claimed in claim 16, wherein each of the housings includes a first opening and a second opening respectively.

18. The heating device as claimed in claim 16, wherein each of the bodies is formed with a concave portion respectively so that the thermal-conductive material can flow in the water jacket when the housings are combined with the bodies.

19. The heating device as claimed in claim 16, wherein the shape of the body corresponds to that of the hydrogen storage canister and the shape of the housing corresponds to that of the corresponding body.

20. The heating device as claimed in claim 19, wherein the hydrogen storage canister is cylindrical, and the bodies and the housings are arc-shaped respectively.

* * * * *